Aug. 11, 1925.
H. R. PENCE
1,549,561
PLOW ATTACHMENT
Filed Feb. 21, 1923
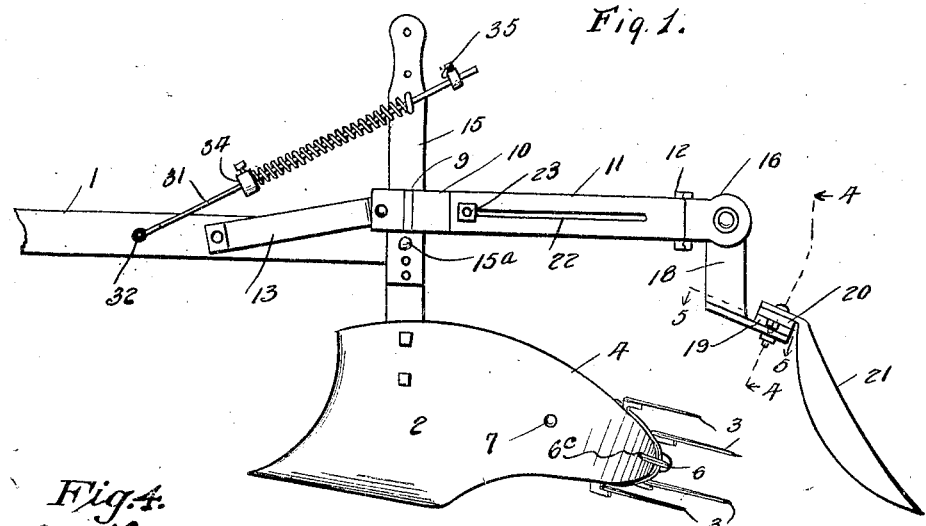
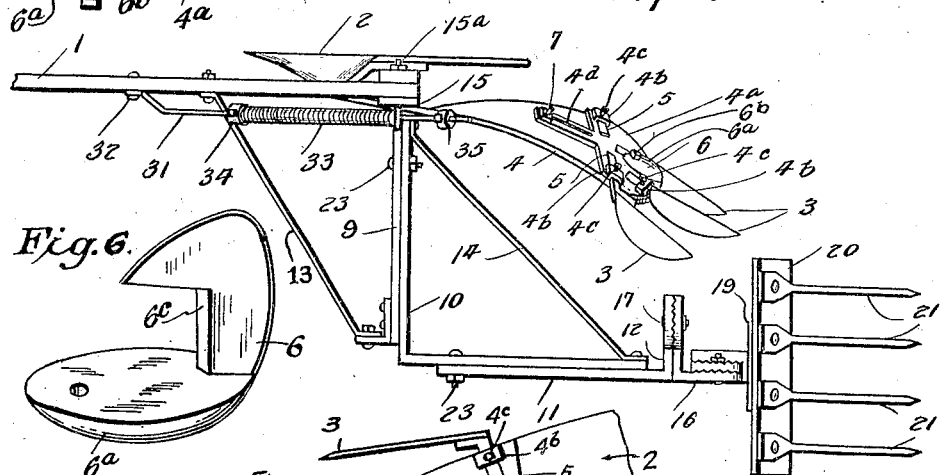
Inventor
H. R. Pence,
By [signature]
Attorney Patented Aug. 11, 1925.

1,549,561

UNITED STATES PATENT OFFICE.

HENRY R. PENCE, OF GAS CITY, INDIANA.

PLOW ATTACHMENT.

Application filed February 21, 1923. Serial No. 620,441.

*To all whom it may concern:*

Be it known that I, HENRY R. PENCE, a citizen of the United States, residing at Gas City, in the county of Grant and State of Indiana, have invented certain new and useful Improvements in Plow Attachments; and I do hereby declare the following to be a full, clear, and exact description of the invention, such as will enable others skilled in the art to which it appertains to make and use the same.

This invention has relation to agricultural implements and more particularly to a plow whereby the land is simultaneously plowed and prepared for planting, the clods being broken up and the soil leveled and prepared for receiving the seed, the usual harrowing being dispensed with.

In accordance with the invention, the rear end of the moldboard is provided with a plurality of knives which have a rearward and lateral disposition, whereby to cut up the slice turned by the moldboard in the operation of plowing, said knives automatically clearing themselves of weeds, trash and the like.

Combined with the plow is a bar provided with a plurality of knives, said bar being adjustable and having adjustable connection with a frame which is adjustably attached to the plow, the latter attachment operating in the capacity of a harrow to crush and level the soil for reception of the seed.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a plow provided with an attachment embodying the invention, Figure 2 is a top plan view, Figure 3 is a detail view of a portion of the moldboard and the knives attached thereto.

Figure 4 is a sectional detail on the line 4—4 of Figure 3,

Figure 5 is a sectional detail on the line 5—5 of Figure 3, and

Figure 6 is a detail view of the clamp for securing the plate to the rear end of the moldboard.

Corresponding and like parts are referred to in the following description and designated in the several views of the drawings by like reference characters.

The numeral 1 designates a plow beam and 2 a plow shovel attached thereto. These parts may be of any well known construction and arrangement and are illustrated to demonstrate the application of the invention.

A plurality of knives 3 are attached to the rear portion of the moldboard 4 and project rearwardly and laterally therefrom so as to cut up the slice of earth as the same is turned when plowing the land. The knives 3 have an approximate parallel relation and their cutting edges are curved so as to readily penetrate the soil and shed weeds and trash. The knives 3, in addition to their rearward and lateral disposition, incline downwardly toward their extremities so as to conform to the movement of the earth and offer a minimum resistance so as not to unduly increase the load of the plow. Each of the knives 3 has a shank 5 by which it is adjustably connected to a plate $4^a$ through a keeper $4^b$ and set screw $4^c$. The plate $4^a$ has a slotted shank $4^d$ by which it is adjustably connected to the wing of the moldboard 4. A bolt 7 passes through the slot of the shank $4^d$ and secures the same to the moldboard in the required adjusted position. A clamp 6 engages the tip of the moldboard and the rear end of the plate $4^a$ and assists materially in securing the plate and the knives carried thereby in the required adjusted position, whereby to admit of arranging and adapting the knives 3 as may be found necessary and advantageous to obtain the best results. Said clamp includes a disk $6^a$ adapted to be secured to moldboard 2 through an opening in plate $4^a$ by bolt $6^b$, and an integral hook member $6^c$ that engages the rear edge and upper side of the moldboard. The edge of hook member $6^c$ is beveled and assists in cutting the slice. In the operation of the plow, the knives 3 cut up the slice of earth during the turning thereof, thereby preventing the formation of clods, and as a result the earth is broken up and falls back into the furrow in a loose condition to be further broken up and leveled in the preparation of the land for receiving seed.

A frame is adjustably connected to the beam 1 and comprises a lateral member 9, an angle member 10 and a rearwardly extending member 11 terminating in a lateral extension 12. A forward brace 13 connects the member 9 with the beam 1. A rear brace 14 connects the elements of the angle member 10 and strengthens the same. A standard 15 extends upwardly from the inner end of the member 9 and is pivoted to the beam 1 at 15ª. A handle, not shown, may be attached to the standard 15. A rod 31 is attached to the beam 1 at 32 and passes loosely through the standard 15. An expansible helical spring 33 is mounted on the rod 31 and is confined between the standard 15 and a set collar 34 adjustable on the rod. A set collar 35 on the upper end of the rod 31 limits the relative rearward movement of the upper end of the standard 15. In the preferable construction, the standard 15, members 9, 10 and 11 constitute parts of a frame which is pivoted to the beam 1 at 15ª. A bracket 16 is pivotally connected to the lateral extension 12 and is held in the adjusted position by means of a bolt 17 which passes through openings formed in the parts 12 and 16, to admit of pivotal adjustment of the bracket when the bolt 17 is loose.

A second bracket 18 is pivotally connected to the bracket 16 in a manner similar to the connection of the bracket 16 with the lateral extension 12. A bar 19 is pivotally connected to the bracket 18 and receives a bar 20 which is provided with a plurality of knives 21, which incline rearwardly and downwardly and have their forward cutting edges curved. The knives 21 serve to break up the earth and level the same to receive the seed.

The member 11 is adjustably connected to an arm of the angle member 10 and the member 9 has the other arm of the angle member 10 adjustably conected thereto, the adjustments being effected by means of slots 22 and bolts 23.

The clamp 6 is used when the rear end of the moldboard is not provided with an opening to receive a bolt. However, it is preferred to use a bolt to secure the plate 4ª to the rear end of the moldboard when the latter is provided with a bolt opening.

The upper element of the clamp 6 tapers to offer a minimum resistance to the passage of the earth when the implement is in operation.

What is claimed is:

1. In a plow, a plate applied to the underside of the moldboard and having a slotted shank, fastening means adjustably connecting the slotted shank of the plate with the moldboard, a clamp connecting the rear end of the plate with the tip of the moldboard, said clamp comprising a disk and an integral hook engaging the plate and moldboard, and a plurality of knives carried by said plate.

2. In a plow, a plate applied to the underside of the moldboard and having a slotted shank, means for adjustably fastening the slotted shanks on the moldboard, means for securing the rear end of the plate to the tip of the moldboard, comprising a disk and an integral hook engaging the plate and moldboard, said plate provided with slots, and knives having shanks engaging said slots and secured in position therein.

3. In a plow, a plate applied to the underside of the moldboard and having a slotted shank, means for adjustably fastening the slotted shank on the moldboard, means for securing the rear end of the plate to the tip of the moldboard, comprising a disk and an integral hook engaging the plate and moldboard, said plates having a plurality of slots arranged on non-parallel planes, and knives having shanks engaging said slots and secured in position therein.

In testimony whereof I affix my signature in presence of two witnesses.

HENRY R. PENCE.

Witnesses:
O. D. CLAWSON,
THOMAS S. SCOTT.